Fig.1.

Fig.2.

United States Patent Office 3,165,349
Patented Jan. 12, 1965

3,165,349
LOCKING STRUCTURES
Didier Costes, Paris, France, assignor to Commissariat à l'Energie Atomique, Paris, France
Filed Aug. 3, 1962, Ser. No. 214,633
Claims priority, application France, Aug. 16, 1961, 870,859
1 Claim. (Cl. 294—97)

The invention relates to means for the temporary fixing of elements capable of sliding in the channels of nuclear reactors, and particularly the fixing of either protective shells on the walls of these channels or of a handling member on such shells.

It is known that it must be possible to carry out the loading or unloading of nuclear fuel elements during the operation of the reactor in the channels or pressure tubes which are traversed by a cooling fluid. It is necessary for this purpose to displace the plugs and protective shell shutting off the end of the channel in question, for example by means of a gripper device mounted at the end of a rod or poker capable of sliding in the channel by being manoeuvred from a loading machine disposed against one of the faces of the reactor.

When the channel is not fitted from one end to the other with active or loading elements, the normal or accidental dynamic forces of the cooling fluid and possibly the gravity (when these channels are not horizontal) may prematurely displace these elements. It is consequently necessary to anchor them and to make them momentarily fast with the wall of the channel. Passive locking means acting by friction and only allowing the movement of these elements from a certain force which is applied to them have already been considered for solving this problem, but such a solution is to be avoided, especially when the co-efficients of friction are uncertain, and particularly in the hot gases.

The invention has for its object to overcome the aforesaid disadvantage by means of a temporary fixing device which ensures the locking of the elements without preventing them from sliding in the channel once the locking means have been rendered inoperative.

It consists in principle of forming this fixing means by resilient tongues anchored at one end on the periphery of the element to be fixed and each capable of undergoing a rocking movement in an axial plane, and in arranging the said means in such a way that the radial movement of the free ends of the tongues in the outward direction to determine the fixing of the element is caused by their inherent elasticity, and in the opposite direction by rods, which have a transverse orientation and are each articulated at one end on a tongue close to the free end of the latter and at the other end on a common control member capable of movement along the axis of the element.

The tongues are moved inwardly towards the axis when the rods pass from a radial position to an inclined position and the reactions which they exert on the control member have an axial resultant so that the control member is able to slide with a small amount of friction. In view of the thin nature of the rods, the assembly provides a large area for the passage of the cooling fluid. When the tongues are in their fixing position, there is a predetermined clearance between the ends of the rods and their seating on the element to be fixed, so that the tongues will maintain their anchoring contact even when the control member is not centrally located.

The control member is advantageously displaced axially by a mechanism having a positive action in the direction which corresponds to the inward displacement of the rods and consequently the removal of the fixing effect, and by a return spring in the other direction.

The particular embodiment of the invention is concerned with the fixing of a protective shell either to the wall of the channel or to a sliding manipulating rod. In this embodiment, the protective shell and the rod are each provided with the foregoing fixing means by respectively forming an inwardly open groove in the shell and cartridge, respectively, the said groove being adapted to receive the free ends of the tongues in the fixing position, the control member of the rod being displaced in one direction by a cable or chain (freeing of the rod and anchoring of the shell with the channel) and being capable of driving, in the other direction and by mechanical contact, the control member of the protective shell (freeing of the shell with respect to the channel and fixing of the said shell to the rod).

In the same way, when the rod grips the shell by its end or gripper device, it simultaneously disconnects the shell from the channel so that it can then freely displace the said shell within the channel.

The inventon will be better understood by reference to the following description and to the accompanying drawing, the said description and drawing being of course only given by way of example.

Figures 1, 2:
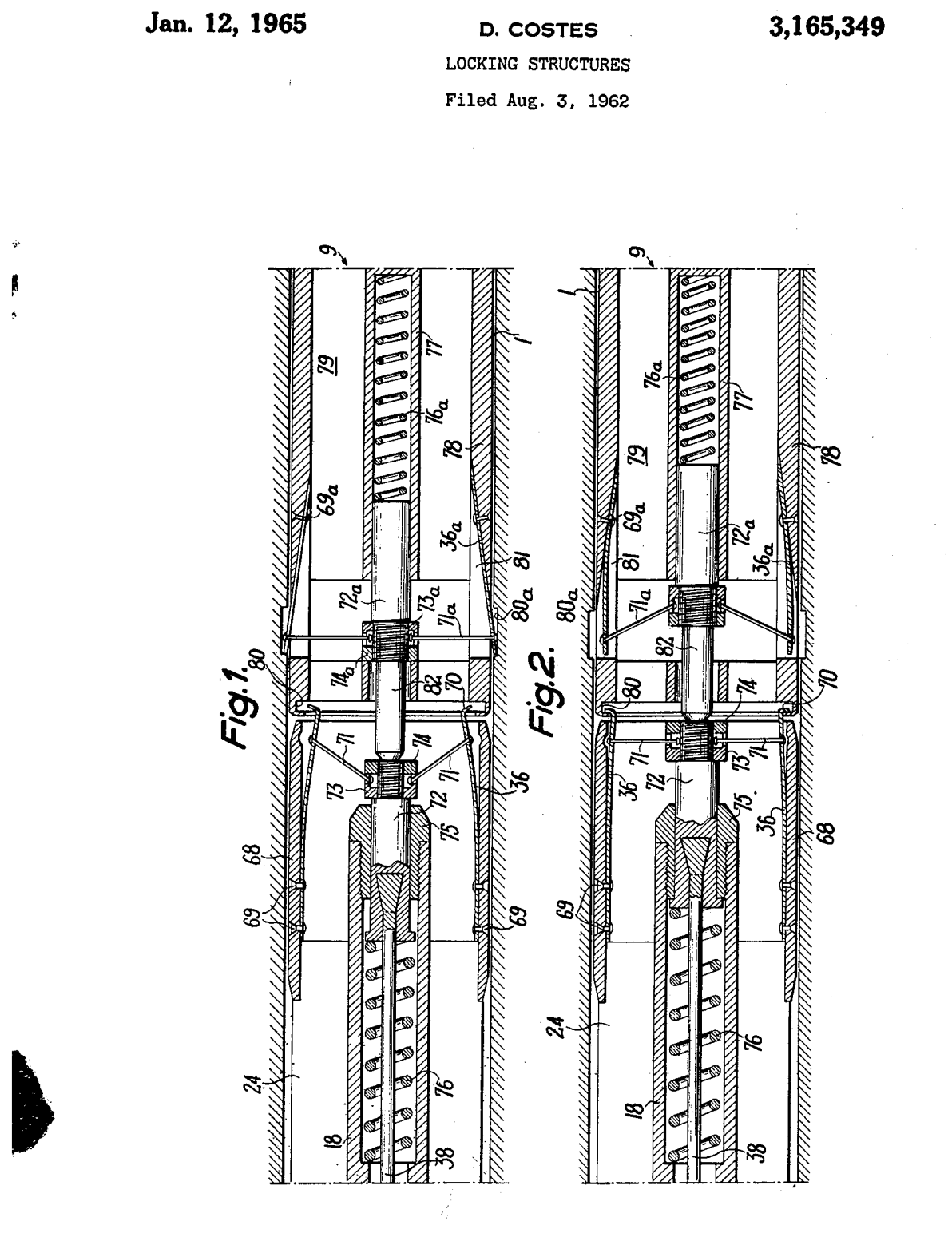

FIGS. 1 and 2 of this drawing show in axial section and in two successive operational positions the inside of a nuclear reactor channel, a protective shell and the end of a manipulating rod or poker associated with a loading machine (not shown), the shell and rod each having fixing means in accordance with the invention.

The poker or rod 18 namely comprises a hollow rod adapted for engagement inside any channel 1 of the pile and of being displaced longitudinally therein. The poker is actuated by a machine assumed to be located to the left of the figures. This rod carries longitudinal fins 24 and, at its end, a tubular member 68 which is fixed on the said fins 24. Anchored inside the member 68 are tongues 36, which are each disposed in an axial plane and which can cover the entire periphery of this member.

The tongues can either be fixed separately, for example by rivets 69, or collectively, for example by being formed by cutting in a circular sleeve of sheet metal fixed at a few points on the member 68. The ends 70 of the tongues, which project axially in relation to the member 68, are bent outwardly, as shown in the figures.

Rods 71 are fixed at one end to each tongue 36, for example by passing through a hole formed in this tongue and being flattened beyond the said hole. At the other end, the rods 71 are fixed to a control member formed by an axial rod 72, for example, by means of a nut 73 having a skirt with longitudinal slots for the passage of the rods, which are flattened inside the said skirt, and a locking nut 74. The rod 72 can slide with respect to the poker rod 18, being guided by a plug 75, consisting for example of graphite. This rod is actuated positively towards the left of the figures by a cable 38 against the action of a spring 76.

The loading cartridge 9 comprises a central tubular member 77 and an external sleeve 78, between which extend fins 79 designed so as to define between them helical passages for a cooling fluid, the material of these fins (steel or graphite) ensuring protection against the fast neutrons. The sleeve 78, which carries an internal groove 80 at its end adapted to receive the inwardly curved ends 70 of the tongues 36, is formed with oblique openings 81 which are traversed by the tongues 36a anchored inside the sleeve 78. These tongues are fixed and actuated in the same way as the tongues 36, but while extending in the opposite direction, the elements which are associated therewith bear the same reference numerals as the elements associated with the tongues 36, except that they are followed by the letter a. The groove 80a, cooperating with the ends of the tongues 36a, is formed in the wall of the channel 1 and the rod 72a slides in the central member 77 enclosing the return spring 76a. However, it is by means of a plunger 82 fast with the rod 72a that the latter is actuated positively by contact with the rod 72.

The operation of the shell and poker rod assembly as above described is as follows:

Normally, the protective shell 9 is anchored in the channel 1, because the tongues 36a, on account of their natural elasticity, engage with their ends in the groove 80a (to the right in FIG. 1), this being permitted by the rod 72a which is urged towards the left by the spring 76a.

When it is desired to remove this shell, the poker rod 18 is introduced into the channel by pulling on the cable 38. As shown to the left in FIG. 1, the cable displaces the rod 72 and thereby the inner ends of rods 71 towards the left in relation to the plug 75. The ends 70 of the tongues 36 are thus drawn radially inwards and can thus pass beyond the edge of the groove 80 in the shell. The cable 38 is then slackened, which permits the spring 76 to move the rod 72 towards the right (FIG. 2) and this movement has a double effect. On the one hand, the plunger 82 drives the rod 72a towards the right against the action of the spring 76a (which is not as strong as the spring 76), thereby removing the ends of the tongues 36a from groove 80a and freeing the shell. On the other hand, the axial displacement of the nuts 73, 74 brings the rods 71 to the perpendicular position, so that the tongues 36 are straightened by their inherent elasticity, and their ends 70 are engaged in the groove 80 of the protective shell. It is then possible to return the poker rod 18 towards the left for extracting the shell 9.

In order to replace the shell in position, it is sufficient to carry out the operations described above but in the reverse sequence.

As will be obvious, and as will moreover already be apparent from the foregoing, the invention is not in any way limited to that of its embodiments, or to those constructions of its various parts which have already been specifically referred to, but on the contrary it covers all the modifications.

I claim:

Temporary locking structure between two coaxial elements comprising a first element, a second element, resilient tongues secured adjacent an end of said first element, an inwardly open groove in said second element receiving said tongues, the elasticity of said tongues urging said tongues into engagement in said groove, a rod for and articulated to each of said tongues adjacent the free end of said tongues, a common control member receiving said rods and means for displacing said member along the longitudinal axis of said first element whereby said tongues are withdrawn from said groove, said control member including a nut, a skirt for said nut, lateral slots in said skirt receiving said rods, an operating rod secured to said nut, a tubular sleeve disposed in the longitudinal axis of said first element, said operating rod sliding in said sleeve, a reactor channel, said first and said second elements sliding in said channel, resilient latching tongues mounted on said second element, a slot for each of said latching tongues in said second element, the resiliency of said latching tongues urging them through said slots into engagement with said channel and means for moving said latching tongues out of engagement with said channel comprising a second rod articulated to each of said latching tongues, a second nut, lateral slots in said second nut receiving said second rods, spring means urging said second nut in a direction for engagement of said latching tongues with said channel and a plunger secured to said second nut and engageable by said operating rod whereby movement of said operating rod to engage said resilient tongues in said groove withdraws said latching tongues from engagement with said channel.

References Cited by the Examiner

UNITED STATES PATENTS

| 529,776 | 11/94 | Brown | 294—86.24 |
| 2,486,489 | 11/49 | McDermott | 294—93 |
| 3,064,855 | 11/62 | Fischer | 294—97 X |

FOREIGN PATENTS

| 688,211 | 8/30 | France. |
| 1,226,658 | 7/60 | France. |

SAMUEL F. COLEMAN, *Primary Examiner.*

REUBEN EPSTEIN, ERNEST A. FALLER, JR.,
*Examiners.*